(12) United States Patent (10) Patent No.: US 8,762,836 B1
Hsu et al. (45) Date of Patent: Jun. 24, 2014

(54) APPLICATION OF A SYSTEM FONT MAPPING TO A DESIGN

(71) Applicant: Axure Software Solutions, Inc., San Diego, CA (US)

(72) Inventors: Victor Hsu, San Diego, CA (US); Martin Smith, San Diego, CA (US); Ian Gardner, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 5 days.

(21) Appl. No.: 13/799,701

(22) Filed: Mar. 13, 2013

(51) Int. Cl.
*G06F 17/00* (2006.01)

(52) U.S. Cl.
USPC ........... 715/269; 715/273; 715/749; 715/748; 715/234; 715/202; 715/235; 715/236; 715/237; 715/249; 715/256

(58) Field of Classification Search
USPC .......... 715/269, 202, 273, 749, 748, 234–266
See application file for complete search history.

(56) References Cited

U.S. PATENT DOCUMENTS

| | | | |
|---|---|---|---|
| 5,544,288 A * | 8/1996 | Morgan et al. ................. | 715/801 |
| 7,174,286 B2 | 2/2007 | Martin et al. | |
| 7,349,837 B2 | 3/2008 | Martin et al. | |
| 7,788,647 B2 | 8/2010 | Martin et al. | |
| 7,861,158 B2 | 12/2010 | Martin et al. | |
| 2007/0006076 A1 | 1/2007 | Cheng | |
| 2007/0094591 A1 | 4/2007 | Etgen et al. | |
| 2007/0168931 A1 | 7/2007 | Martin et al. | |
| 2011/0093565 A1 | 4/2011 | Bacus et al. | |
| 2011/0258535 A1 | 10/2011 | Adler, III et al. | |
| 2012/0079374 A1 | 3/2012 | Gaddis | |
| 2012/0102391 A1 * | 4/2012 | Lee et al. ...................... | 715/235 |
| 2012/0174002 A1 | 7/2012 | Martin et al. | |
| 2012/0278701 A1 | 11/2012 | Bockus et al. | |

OTHER PUBLICATIONS

"Comprehensive Features List", QuarkXPress, accessed on Mar. 13, 2013, www.quark.com/Products/QuarkXPress/Features/List.aspx.
"Features", Dreamweaver CS6, Adobe Creative Suite Family, accessed on Mar. 13, 2013, www.adobe.com/products/dreamweaver/features._sl_id-contentfilter_sl_featuredisplaytypes_sl_all.html.
"Features", LibreOffice, accessed on Mar. 13, 2013, www.libreoffice.org/features/.

* cited by examiner

*Primary Examiner* — Quoc A Tran
(74) *Attorney, Agent, or Firm* — The Mueller Law Office, P.C.

(57) ABSTRACT

Embodiments of the present invention provide for the efficient application of a system font mapping to a design. Specific embodiments of the invention involve creating a design environment for a user that is configured to display a design. The design environment allows a user to apply a design font to text in the design. The user is also allowed to define a mapping from the design font to a target font. These embodiments also include generating a markup language representation of the design and applying the mapping to the design. The text is linked to the design font using an encoding prior to the generating step, and the text is linked to fonts in the markup language representation using a different encoding.

23 Claims, 4 Drawing Sheets

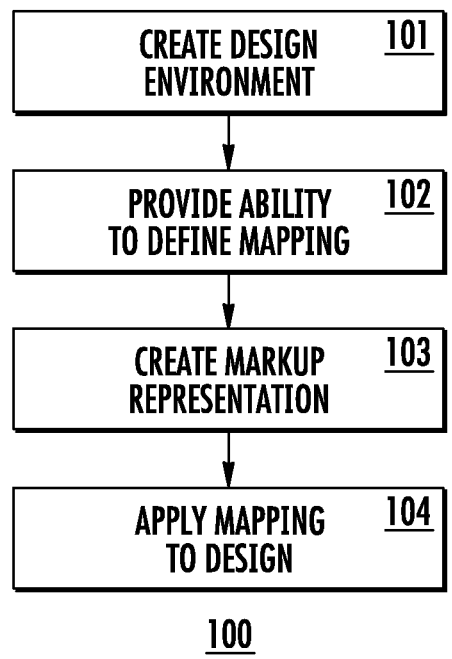
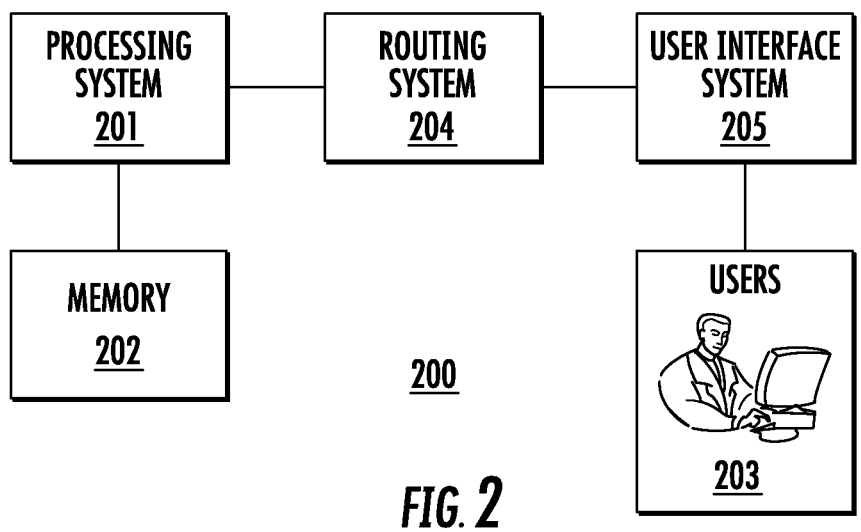

APPLICATION OF A SYSTEM FONT MAPPING TO A DESIGN

BACKGROUND OF THE INVENTION

Design programs allow users to produce designs such as word documents, web pages, spreadsheets, and illustrations. Word processors were one of the first design programs to be developed. They have a lineage that traces back to the late 1960s. These programs were generally run on specialized machines. These word processors were expensive, and were only owned by a limited number of large enterprises. Today, word processors are available to the public at large, along with a multitude of other design programs that have come into mainstream usage in the recent past.

The ever increasing access of more and more powerful design programs to an increasing number of people has unlocked a flood of human creativity. The number of publications produced each year is rising at an exponential rate as word processing has brought the power of professional text editing to the masses. The more recent, but no less important, development of visual web page design programs such as Axure RP, a product provided by the Applicant, has likewise dramatically increased society's potential creative output by bringing web page design out of the control of the limited set of persons that are capable of writing code.

The ever increasing degree of access to design programs has fueled an increasing need for interoperability between design programs and the players used to render their designs. However, the need for interoperability is often at odds with the need to offer users as rich and flexible a design program as possible. For example, many of the first word processors only offered users the ability to create a design using a single font. Therefore, rendering this design in another word processor was not an issue because every version of that word processor was guaranteed to utilize that font. Today, the constant drive to enable more creative opportunities has resulted in a situation where even versions of the same word processor are sometimes incapable of rendering a design that was created in that same design program. For example, if one user downloaded a font from the Internet, and applied it to a design before sending the design to another user, the recipient user would be unable to properly render the design even when using the same word processor without downloading that same font from the Internet. This is an even greater problem in the web design space because users expect to be able to appreciate the same end user experience regardless of their choice of web browser. Furthermore, users of web design programs expect a greater degree of flexibility in font selection because those engaged in web design are generally far more concerned with the aesthetics of their designs as compared to those who are using word processors.

Various solutions are available in the related art to deal with the problems caused by the explosion in available fonts and the increasing need for interoperability between designs and players. One solution is the usage of web safe fonts. Web safe fonts are fonts that are generally consider ubiquitous such that it is highly likely that any computer used as a player to render a design with those fonts will have the fonts available to accurately render the design. Another solution is the usage of web fonts. Web fonts are fonts that are readily available for download from the web. As such, theses fonts do not need to be available locally on a player when the player is asked to render a design that utilizes them. Instead, the design includes a pointer that indicates where the font is available. The design can thereby be rendered by obtaining the font from the web using the pointer and applying the font as instructed by the design.

More specific examples of how to address issues with font incompatibility utilize the concept of substitution to replace fonts that the player does not have available. For example, the related art teaches methods of converting PDF documents into HTML 5. The player in this case replaces characters detected in the PDF document by analyzing them and matching them with web fonts that will then render the original design of the PDF. As another example, a program may allow users to replace certain fonts in a design when it is brought into the design program. A user interface for an application is provided that allows a user to specify a font name and a replacement font. Whenever a font that was specified in this user interface is brought in to the application, it is replaced when the design is rendered by the application. This functionality could therefore be used to specify a font that may be missing from the application's library and associate it with a similar font known to the application which could then be used to render a design that utilizes the missing font.

SUMMARY OF INVENTION

In one embodiment of the invention, a method is provided. The method involves creating a design environment for a user that is configured to display a design. The design environment allows a user to apply a design font to text in the design. The user is also allowed to define a mapping from the design font to a target font. The method also includes generating a markup language representation of the design and applying the mapping to the design. The text is linked to the design font using an encoding prior to the generating step, and the text is linked to fonts in the markup language representation using a different encoding.

In another embodiment of the invention, another method is provided. The method involves receiving a font mapping from a design program user. The method also involves exporting a design with a system font from a design program. The method also involves applying the font mapping to the design during the exporting step. During the applying step, the font mapping maps the system font to a corresponding target font.

In another embodiment of the invention, a user interface is provided. The user interface involves a user mapping input interface for receiving a mapping from a user. The user interface also includes an export command input interface for triggering an export of a design from the design program. The user interface also includes a system font selection interface for receiving a user system font selection input. The user interface also includes a design display interface for displaying a graphical representation of the design. The mapping maps a system font to an alternative font and is applied to the design during export.

BRIEF DESCRIPTION OF THE DRAWINGS

FIG. 1 illustrates a flow chart of a method of defining and applying a mapping to a design that is in accordance with embodiments of the present invention.

FIG. 2 illustrates a block diagram of a computer system that is capable of being used in accordance with embodiments of the present invention.

DETAILED DESCRIPTION OF THE EMBODIMENTS

Figure 3:
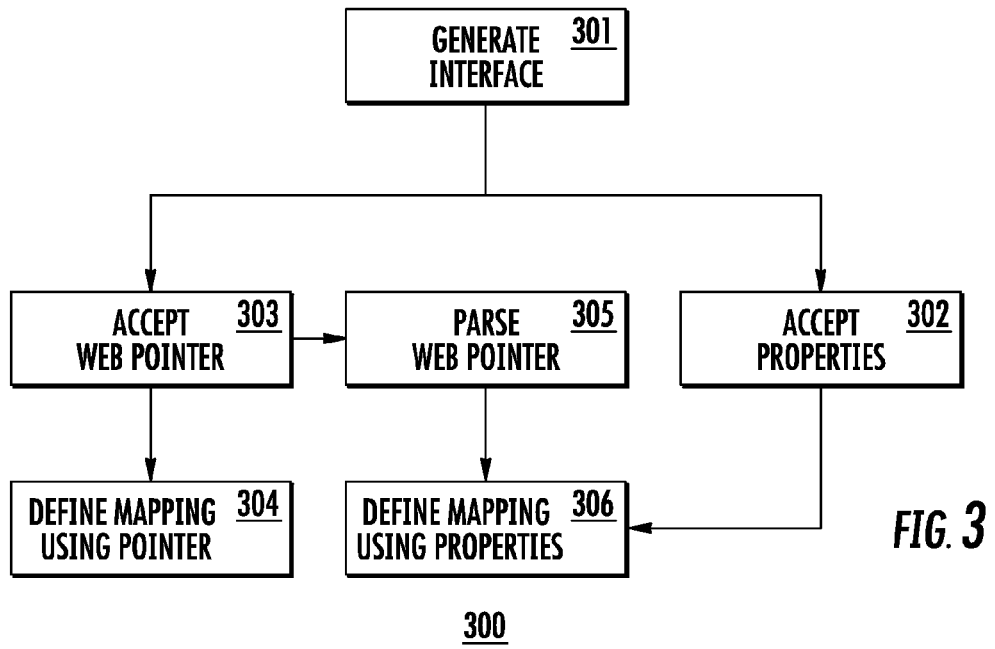
FIG. 3 illustrates a flow chart of a set of methods for defining a mapping that are in accordance with embodiments of the present invention.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

The invention relates generally to the use of fonts in visual design environments, and more specifically to the generation and usage of font mappings in design environments.

Embodiments of the present invention provide for the specification of a font mapping by a user of a design program, and the application of that font mapping to a design. For example, a user could use a design program to design a web page or a prototype of a web page, and use specific embodiments of the present invention to provide a font mapping between the design and a web page generated for that design.

A specific embodiment of the invention can be described with reference to FIGS. 1 and 2. FIG. 1 displays a block diagram describing a method 100 that is in accordance with embodiments of the invention. Step 101 comprises creating a design environment for a user. The creating step can be conducted using a computer system 200 as shown in FIG. 2. For example, the design environment could be instantiated by a processing system 201 acting in tandem with a memory system 202. The user 203 would be able to access this created design environment through the use of routing system 204 and a user interface system 205. In specific embodiments, the design environment will be a visual web design environment that will display a web page design. In these embodiments, user 203 will be a web page designer using computing system 200 to design a web page. The web page design may contain text. The text will appear in a specified format to the user 203 through user interface system 205. In specific embodiments, the font will be a design font that is known by the processing system 201 and memory system 202. For example, the design font could be Times New Roman.

Step 102 comprises providing a user with the ability to define a mapping from the design font to a target font. Referring again to FIG. 2, processing system 201 and memory system 202 may provide this ability to user 203 through routing system 204 and user interface system 205. In a specific embodiment, step 102 will allow user 203 to enter in a font name using user interface system 205. This font name may correspond to a design font that is being used in the current design. In keeping with the example in the prior paragraph, this design font could be Times New Roman. In this embodiment, the user will be able to define a mapping by associating this font name with a target font. This target font may be a font that is not known to processing system 201 and memory system 202. The target font may be a web font that is associated with a web font pointer provided by a third party. At this point, the user 203 will have defined a mapping that associates Times New Roman with the selected web font. Any text that is currently being rendered in Times New Roman on the user interface system 205 in the design will still appear as Times New Roman, but the mapping will be stored by the computing system 200 in memory system 202.

Step 103 comprises generating a markup language representation of the design in which the mapping has been applied. In specific embodiments, this step will involve processing system 201 and memory system 202 operating to generate an HTML encoding of the web page that can be rendered by a web browser. If computing system 200 has both a design program and a web browser that are available to user 203, then user 203 will be able to view the generated design using the web browser as a player.

Step 104 comprises applying the mapping to the design. This step can be performed as part of the generating step 103. Continuing with the example from the previous paragraph, the mapping is applied to the representation of the design generated in step 103, and the text that was formerly rendered using Times New Roman will now appear rendered using the web font that was mapped to Times New Roman by the user in step 102.

In the specific example described above, the design is not rendered using the target font while the font is viewed in the design environment; it is only rendered using the target font when the design is rendered outside of the design environment in an external player or inside the design environment in a virtual external player instantiated within the design environment. This produces significant beneficial results. First, there are often problems with loading certain fonts into a design environment. In particular, rendering a font may require use of a copyright to the rendered font. Specific embodiments described above avoid this copyright requirement while still allowing the user of the design environment to provide a version of the design to the end user in which the copyrighted font is rendered. Furthermore, specific embodiments described above avoid the need to install multiple font libraries in the design tool. If the design fonts are kept to a limited set, then storage space will be saved on the computing system that is used to create the design environment, and the user will not have to waste time loading fonts from a font library during the design process. Embodiments of the invention effectively provide the designer with an unlimited font library without any detrimental effect on the computing system used to create the design environment. An additional benefit to specific embodiments described above is the preservation of flexibility for the user of the design tool. A user can create a design with standard system fonts and can easily generate multiple versions of the same design by simply changing the font mapping. This functionality is especially beneficial considering the fact that a user's design environment is often constant while, particularly in the case of web page designs, the final design will be viewed using players on a large selection of computing devices with varying screen sizes, luminosities, color palates, and of course—available fonts.

Some embodiments described above specifically referred to applying the mapping to the design during the generation step. In specific embodiments of the invention, this generation step will involve the creation of a coded representation of the design through an export process. The coded representation serves to effectively export the design from the design environment because the coded representation can exist and be rendered apart from the design environment. In specific embodiments, this coded representation will be a markup and style sheet language description of the design. A small portion of the exported design could be the following CSS code:

font-family: "Franklin Gothic";
    font-weight: bold;
    font-style: italic;

The CSS code above defines a font family called Franklin Gothic and selects the bold and italic typeface of that font. Franklin Gothic is not generally considered a web safe font. Therefore, it would be beneficial to map any usage of Franklin Gothic in a design to a web safe font such as Arial if the design was being used to generate a design instantiation meant to be rendered by unsophisticated players. One solution would be to modify the CSS code to swap out the word "Franklin Gothic" with "Arial." The resulting code would appear as follows:

font-family: "Arial";
    font-weight: bold;
    font-style: italic;

This simple substitution could be applied to the design after the fact. For example, a simple text editor could be used to operate on the original code and change the text "Franklin Gothic" to the text "Arial." However, this code segment is an extremely simple example. After a design is exported from a design program, the entropy of the code spikes dramatically. This is because HTML and CSS are tag-based coding systems where every text element has to be assigned a font. Likewise, the fonts are not described as simply as they are above. The font definitions are often intermingled with back up fonts and various other attributes besides weight and style. In specific embodiments of the invention, before the code is exported to HTML or a web browser experience is rendered from a design, the design is in a non-tag based encoding which allows modifying the code much more manageable to handle. Furthermore, regardless of the non-tag based encoding, the design is much easier to modify for the obvious reason that it is still inside the design environment—which is made specifically to facilitate the easy editing and modification of a design. As such, the encoding of the design inside the design environment will generally be different than the encoding once it is exported from the design environment.

In specific embodiments of the invention, various font mappings can be utilized. The font mapping can be from a set of system fonts to a set of target fonts. This mapping can be defined by a user of a design program. The system fonts can be a set of fonts known to the design program or design environment prior to a first interaction between the design program and the user. For example, the set of system fonts could be a library of fonts that are preinstalled in the design program when the design program is marketed. The set of system fonts could also include fonts that a user added to the design program from an external library. The set of possible system fonts can be a closed set. The set of system fonts could be a single font. The set of target fonts can likewise by a single font. An example target font is a web font or a web safe font. Another example of a target font is a font that is optimized for a particular class of players. For example, one target font could be optimized for mobile devices with small screens, while another would be optimized for devices with larger screens. These embodiments would be beneficial for design program users producing designs for viewing on a wide range of devices. Another example of a target font is a font that is known to be generally available for a specific class of players (e.g., a font known to be within the library of a commonly used web browser or document viewer). The target fonts could be fonts that are known to the design program, and the set of system fonts and target fonts can overlap. In addition, a single system font could be mapped to multiple target fonts. Such embodiments would allow a design program user to set secondary target fonts such that if a first target font were not available for rendering in a player, the secondary target font could be used instead.

In specific embodiments of the invention, the mapping between a particular system font and associated target font can take on various characteristics. The mapping between the target font and a system font could include all of the characters in a human language script. For example, the mapping could include all of the characters in the English alphabet. The mapping could also include all of the characters that are in a full published version of the system font. The mapping could also include all of the characters that are defined in a font library for a system font. The mapping could also be limited to the set of characters that are used in a design, or any other limited set of characters. The mapping may also map multiple characters in a system font to a single character in a target font. For example, an accented vowel and unaccented vowel in a system font could both map to a single unaccented vowel in a target font. The extent of a mapping of one system font to a target font in a font mapping does not have to be uniformly applied across all system font-target font pairs in that font mapping. For example, one pair in a font mapping could have multiple system font characters mapped to a single target font character while another pair could have a one-to-one character mapping between a system font and target font.

In specific embodiments of the present invention, the font mapping can be defined in numerous ways. Target fonts can be defined by a user before or after they are mapped to a system font. Target fonts can likewise be defined at the same time they are mapped to system fonts. System fonts can be selected for a mapping from a menu listing a collection of available system fonts, or the name of a selected system font could be entered by typing the name of the font in response to a prompt.

FIG. 3 illustrates a set of methods 300 for allowing a user of a design program to define a font mapping. Like the method described in FIG. 1, the set of methods 300 can be executed by a computing system such as computing system 200. In step 301, portions of computing system 200 facilitate the creation of interfaces for the user of a design program. Exemplary interfaces are described below with reference to FIGS. 5-7. These interfaces may comprise a visual design interface for the design environment and design program. These interfaces may allow a user to define any of the mappings described above and combinations and variations thereof.

In step 302, a design program user manually inputs a target font definition which is accepted by the computer system 200. The user can manually input a target font by entering font properties for a target font in a prompt provided in the design program interface. For example, a user could input a set of style sheet or markup language properties for a target font in response to a collection of prompts for those properties. As a more particular example, a user could input CSS properties for a target font. In other embodiments, a user can use any font description language to describe a target font having any arbitrary weight, style, or stretch.

In step 303, a design program user specifies a web font pointer as a target font definition which is accepted by the computer system 200. A user could manually input a web font pointer to define a target font or could input a URL for a web font. The web font pointer or URL may link to multiple definitions for multiple fonts, and the user of a design program may be given the option to select a target font from among these multiple fonts. As illustrated by step 304, this web font pointer could be all that is used by the design program to define a target font. As another example, a user could manually input an @font-face definition.

In step 305, a web font pointer is parsed to extract a CSS definition. This parsing could be conducted by processing system 201. In step 306, a target font is defined using the extracted CSS properties from step 305 or the properties defined by the user in step 302. For example, a design program user could paste in an @font-face definition to specify a target font. The processing system 201 could then parse the @font-face definition for the CSS properties specifically associated with that font and use those properties to define a target font. The associated parsing step in this example could be accomplished by a scraping process acting upon the web font definition to which the web font pointer leads or the web font pointer itself.

Figure 4:
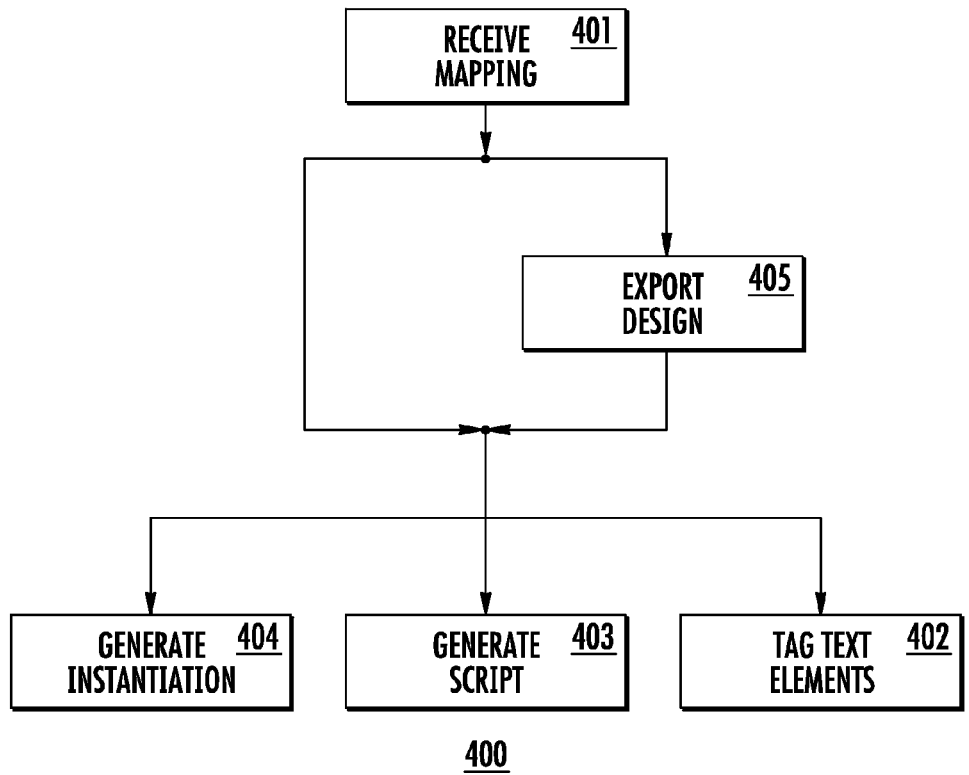
FIG. 4 illustrates a flow chart of a set of methods for applying a mapping to a design that are in accordance with embodiments of the present invention.

FIG. 4 illustrates a set of methods 400 for applying a font mapping to a design. Like the method described in FIG. 1, method 400 can be executed by computing system 200. In step 401, computer system 200 receives a font mapping. Step 401 can be conducted in accordance with any of the methods described above with reference to FIG. 3, and also may be conducted in accordance with other methods described herein and variants thereof. Once the mapping has been received by the design program, the mapping can be applied to the design in various ways.

In step 402, the mapping is textually applied in a code representation of the design. As in the illustrated example, the mapping could be applied by tagging the code associated with certain text elements in the design that are associated with the system font using tags associated with the target font. In this example, a portion of text that was rendered in the design environment or design program in a particular system font would be tagged with its corresponding target font according to the defined mapping. In a more specific example, the code would be in a CSS style sheet language and an HTML markup language, and the relevant portion of text in the code would be tagged with the target font. The mapping could also be applied by modifying @font-face definitions in a CSS style sheet language code. To illustrate this particular example, the following @font-face definition:

@font-face{
font-family: "Web Font";
font-weight: bold;
font-style: italic;
src: url(http://webfont.webadress.woff) format('woff');
} would be textually modified to map the system font Franklin Gothic to the web font as follows:

@font-face{
font-family: "Franklin Gothic";
font-weight: bold;
font-style: italic;
src: url(http://webfont.webadress.woff) format('woff');
}

In step 403, the mapping is applied by generating a script to modify an instantiation of the design at a later time. For example, the mapping could be applied to a generated code such that the script would textually modify the encoded representation of the design. As another example, the mapping could be applied to modify an object model of the design. This generating step can be conducted by processing system 201. The script could be packaged with the code such that the mapping could be textually implemented in the code at a later time when the script was used to replace portions of the code. The script could be designed to execute any of the methods described above with reference to step 402. In a very specific example of step 403, the script would be run by a player that received a package containing the code and script in order to properly render the mapping with the target fonts. The player could be a web browser with a plug in for running the script.

In step 404, the mapping is applied by generating an encoded instantiation of the mapping to modify the design at a later time. This generating step could also be conducted by processing system 201. The instantiation could then be packaged with a code representing the design. In the embodiments in which step 404 is executed, the encoded instantiation could be resolved at a later point to render a version of the design in which the system fonts were replaced by the target fonts to which they were mapped. The encoded instantiation could be applied when a computation construct renders an end user experience involving the design.

In specific embodiments of the invention, the font mapping can be applied to the design at various times. The font mapping could be applied during or after a design export or generation step. One example of this approach is illustrated by the optional step 405 in FIG. 4, in which the application of the mapping to the design follows or is triggered by the export step. Applying the font mapping during the export step would involve producing a representation of the design that could be rendered on external players, where the representation was instantiated with the mapping applied to the design. As a specific example, the export step could produce a markup and style sheet language encoding of the design capable of being rendered in a web browser, in which the text elements that had previously been displayed using the system fonts were tagged with their corresponding target fonts. As a result, if the exported code were rendered using a web browser, those portions of text would appear in the target fonts even though the same text appeared in the design environment in a system font. The font mapping could also be applied during a generation step in which the design was used to render an end user experience without generating an intermittent coded representation of the design.

In specific embodiments of the invention, the font mapping could be applied before a design is exported from the design program or design environment. The mapping could also be applied to a limited portion of the design, and could be applied to different portions of the design at different times. For example, the mapping could be applied to a design as soon as an @font-face definition was pulled in from a third party server. In this example, a user would specify a URL for an @font-face definition in response to a prompt, and the mapping would be applied as soon as the code for the @font-face system was pulled into the design environment or design program. This could involve modifying the @font-face definition textually to apply said mapping.

Figure 5:
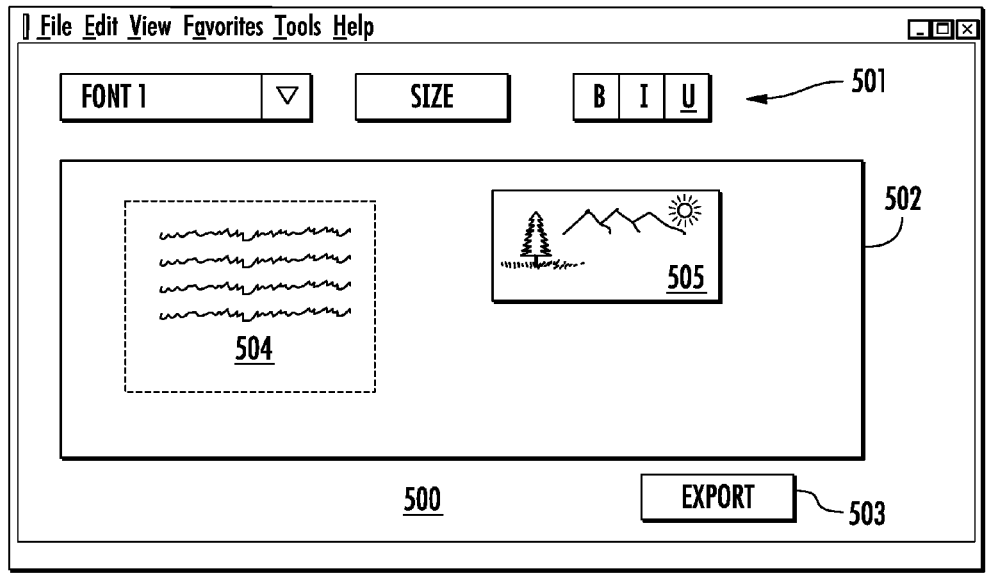
FIG. 5 illustrates a user interface that is in accordance with embodiments of the present invention.
Figure 6:
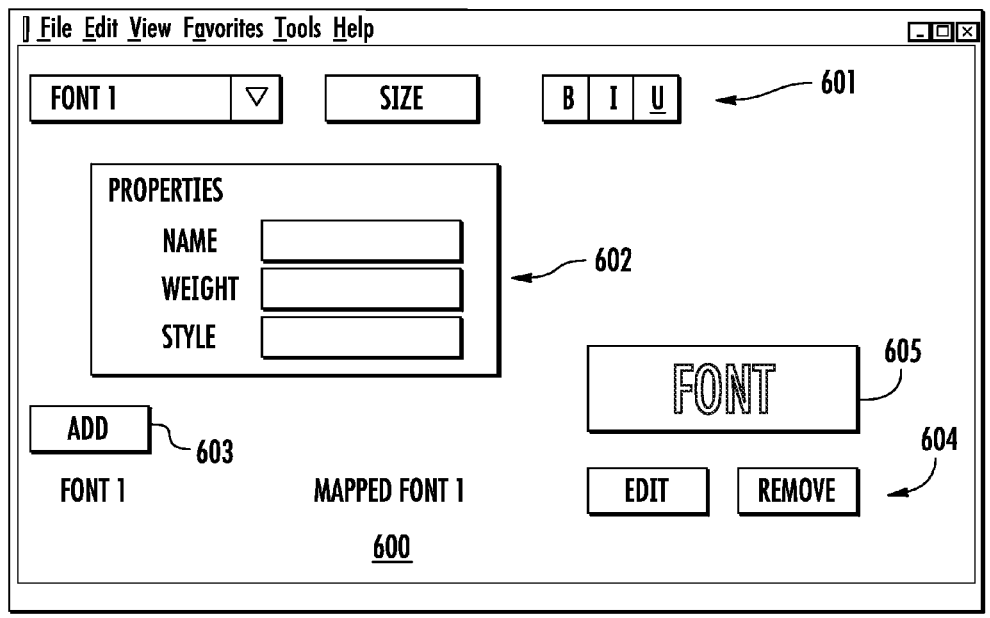
FIG. 6 illustrates a user mapping input interface that is in accordance with embodiments of the present invention.
Figure 7:
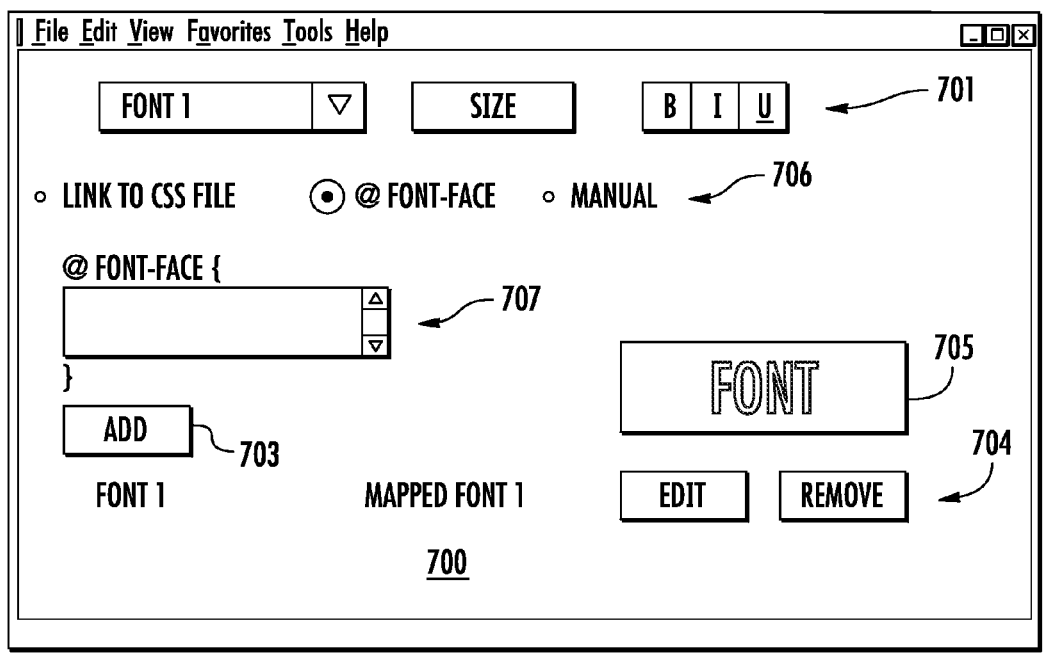
FIG. 7 illustrates a user mapping input interface with multiple input mode options that is in accordance with embodiments of the present invention.

User interfaces that are in accordance with embodiments of the present invention are illustrated in FIGS. 5-7. The illustrated interfaces and all variations described below could be displayed to a user through the use of computing system 200. FIG. 5 illustrates a user interface 500 having a system font selection interface 501, a design display interface 502, and an export command interface 503. The design display interface 502 is illustrated as having a text portion 504 and an image portion 505. In specific embodiments, the design could be a web page design. Using user interface 500, a design program or design environment user could be able to select text in text portion 504 and apply a system font to the selected text using system font selection interface 501. The text in text portion 504 will then be rendered in the system font and appear in the system font in design display interface 502.

FIG. 6 illustrates a user mapping input interface 600. The user mapping input interface 600 includes a system font selection interface 601 which could be the same as the system font selection interface in FIG. 5. The user mapping input interface also includes a list of prompts 602 that allow a user to manually input properties to define a target font. Once a user has specified properties for a particular target font, the user can select the ADD button 603 to add the font to a mapping stored by the computer system 200. The user mapping input interface 600 can also include a mapping display interface 604 that will display system font-target font pairs that have already been mapped. The mapping display interface 604 can also include buttons such as EDIT and REMOVE to allow the user to modify the stored mapping. Mapping display interface 604 is illustrated as a list, but any ordered representation of the mapping could be displayed instead. The user interface could also include a text display interface 605 that would display a sample of the target font as it is currently defined in the user mapping interface.

FIG. 7 illustrates a user mapping input interface 700 having multiple options for receiving a mapping from a user. Again, the interface can include a system font selection interface 701, an ADD button 703, a mapping display interface 704, and a text display interface 705 that can all be the same as the corresponding interfaces in FIG. 6. Furthermore, user mapping input interface 700 can include an input type selection interface 706 which is illustrated in FIG. 7 as a row of selectable buttons. Depending upon which button is selected in input type selection interface 706, the target font input interface 707 will change its appearance to provide a prompt that is compatible with the selected type of input mode. As illustrated, the @font-face button is selected, and the target font input interface 707 appear as an @font-face definition prompt with a section of text for entering such a definition to define the target font. In the alternative, if the Manual CSS Property button is selected, then the target font input interface will appear as the prompts 602 in FIG. 6. Finally, if the link to .css file button is selected the target font input interface 707 will appear as a prompt for a URL pointing to a CSS file available externally to the design program or design environment.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. For example: the mapping could be predefined by the system or provided by another user and loaded into a current design environment prior to its application; the generating step can involve generating a C or Basic representation of a design and/or a mapping; the mapping can be applied after a certain period of time from an export or generation step, and this time could be set by a user; a user could send their mapping to another instantiation of the design environment so that the other design environment could take in a representation of the design in which the mapping had been applied and return it to its original status within the design program automatically; and a user could put place-holders in for the target fonts that will inform different browsers to pull different web fonts. FIG. 2 is only an illustrative computer system that is amenable to operation in accordance with embodiments of the present invention and variant computer system topologies may be used in its stead. Nothing in this description should limit the processor of processing system 201 to a single processor, as the function of this block can be accomplished by multiple physical processors located either on a single work station or distributed through a network. It is not essential for memory 202 to be physically distinguishable from processing system 201, as they are merely illustrated as separate blocks for purposes of invoking common conceptions of how computing systems operate. Routing system 204 could be the internal routing system of a single work station, a LAN, a WAN, a wired or wireless network, the Internet, or any other system capable of routing signals. User interface system 205 could be a work station, a computer, a mobile phone or other mobile device, or any computing device or group of computing devices capable of receiving inputs from a single user or group of users. User interface system 205 can be any system that allows a user to input commands to the system and receive any feedback from the system that is necessary to operate computing system in accordance with embodiments of the present invention. For example, user interface system 205 could be a workstation having a keyboard, mouse, and visual display. FIG. 2 should also not be taken to indicate that the invention can only involve design environments or design programs that may only be accessed by one users as there could be multiple users 203 and that group of multiple users 203 could access the design environment using any number of routing systems 204 and user interface systems 205. Those users could also access the design environment simultaneously. Furthermore, nothing in the disclosure should indicate that the invention is limited to systems and methods that involve web browsers. In general, any diagrams presented are only intended to indicate one possible configuration, and many variations are possible. Those skilled in the art will also appreciate that methods and systems consistent with the present invention are suitable for use in a wide range of applications encompassing any related to displaying text.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method comprising:
   creating a design environment for a user, said design environment configured to display a design, and said design environment allowing said user to apply a design font to a portion of text in said design;
   providing said user with the ability to define a mapping from said design font to a target font;
   receiving said mapping from said user while said user is creating said design;
   generating a markup language representation of said design; and
   applying said mapping to said design;
   wherein said design font is linked to said portion of text in said design:
      (i) continuously before and after said mapping is received from said user, and
      (ii) using an encoding prior to said generating step;
   said portion of text in said design is not displayed using said target font while said design is edited in said design environment;
   said target font is linked to said portion of text in said markup language representation using a different encoding; and said portion of text in said markup language representation is displayed using said target font while said design is rendered outside of the design environment in an external player or inside the design environment in a virtual external player instantiated within the design environment.

2. The method of claim 1, wherein:
said mapping maps a full published version of said design font to said target font; and
said mapping is applied during said generating step.

3. The method of claim 2, wherein:
said target font is a web font associated with a web font pointer provided by a third party; and
said mapping is applied when said web font pointer is utilized.

4. The method of claim 3, wherein said web font pointer utilizes an @font-face definition.

5. A method comprising:
receiving a font mapping from a user via a computer system, said user operating a design program;
exporting a design from said design program, said design including a system font; and
applying said font mapping to said design during said exporting step using a processor;
wherein, during said applying step, said font mapping maps said system font to at least one corresponding target font;
said system font is linked to said design:
(i) continuously before and after said font mapping is received from said user, and
(ii) using an encoding prior to said exporting step;
after said exporting step, said target font is linked to said design using a different encoding;
said design is not displayed using said target font while said design is viewed in said design program; and
said design is displayed using said target font when said design is rendered outside of said design program in an external player or inside said design program in a virtual external player instantiated within the design program.

6. The method of claim 5, wherein said exporting step generates a code, at least a portion of said code being in a markup language.

7. The method of claim 6, wherein:
said applying step applies said mapping, at least in part, by generating a script to modify an object model of said design after said object model has been instantiated; and
said object model of said design is instantiated after said applying step.

8. The method of claim 6, wherein said applying step textually maps said system font to said target font in said code.

9. The method of claim 6, wherein:
a text element in said design is associated with a system font; and
said applying step applies said mapping, at least in part, by tagging said text element in said portion of said code with a particular target font that corresponds to said system font.

10. The method of claim 6, wherein said applying step further comprises:
generating an encoded instantiation of said mapping;
wherein said instantiation of said mapping is configured to be applied to said code by a web browser that will render a graphical instantiation of said design from said code.

11. The method of claim 5, wherein:
said exporting step generates a code that uses a markup language and a style sheet language; and
said corresponding target font is a web font.

12. The method of claim 5, further comprising:
limiting said user to a set of input fonts for said mapping;
wherein said set is a set of system fonts known to said design program prior to a first interaction between said design program and said user.

13. The method of claim 12, wherein said mapping maps at least a full set of characters in a human language script between said system font in said mapping and said corresponding target font.

14. The method of claim 13, wherein:
said exporting step generates a code that uses a markup language and a style sheet language; and
said corresponding target font is a web font.

15. The method of claim 5, further comprising facilitating the creation of an interface for said user, said interface allowing said user to manually define said target fonts using a set of style sheet language properties.

16. The method of claim 5, further comprising facilitating the creation of an interface for said user, said interface allowing said user to define target fonts using a web font pointer.

17. The method of claim 16, further comprising:
parsing said web font pointer to extract a set of style sheet language properties; and
defining said corresponding target font using said set of style sheet language properties.

18. The method of claim 16, wherein said web font pointer utilizes an @font-face definition.

19. The method of claim 17, further comprising facilitating the creation of an interface for said user, said interface allowing said user to define a secondary target font for said corresponding target font.

20. The method of claim 17, wherein said applying step applies said mapping, at least in part, by modifying said @font-face definition to reference said system font.

21. A work station comprising:
a memory;
a user mapping input interface, for receiving a mapping from a user;
an export command input interface for triggering an export of a design;
a system font selection interface, for receiving a system font selection from said user; and
a design display interface, for displaying a graphical representation of said design;
wherein said design display interface and said system font selection interface allow said user to apply a system font to said design;
said mapping maps said system font to an alternative font;
said system font is linked to said design:
(i) continuously before and after said mapping is received from said user, and
(ii) using an encoding prior to said export of said design;
and said alternative font is linked to said design using a different encoding after said export of said design;
said design is not displayed using the alternative font while the design is displayed in the design display interface; and
said design is displayed using said alternative font while said design is rendered in an external player or a virtual external player.

22. The work station of claim 21, wherein:
said mapping maps a full published version of said system font to said alternative font; and
said mapping is applied during said export of said design.

23. The work station of claim 21, wherein:
said user mapping input interface allows said user to select between a set of two options for defining said alternative font; and
said set of two options consists of:
  (i) manually inputting a set of style sheet language properties and
  (ii) using a web font pointer.

\* \* \* \* \*